United States Patent
Yeh et al.

(10) Patent No.: US 6,325,984 B1
(45) Date of Patent: Dec. 4, 2001

(54) PD/NAOH-AL$_2$O$_3$ CATALYST FOR NO$_X$ ABATEMENTS

(75) Inventors: Chuin-tih Yeh, Hsinchu; Chen-bin Wang, Taoyuao, both of (TW)

(73) Assignee: National Science Council, Taipei (TW)

(*) Notice: Subject to any disclaimer, the term of this patent is extended or adjusted under 35 U.S.C. 154(b) by 0 days.

(21) Appl. No.: 09/329,762

(22) Filed: Jun. 10, 1999

(30) Foreign Application Priority Data

Sep. 17, 1998 (CN) .................................. 87115537

(51) Int. Cl.$^7$ .................. B01J 8/00; B01J 8/02; C01B 21/00
(52) U.S. Cl. .................. 423/239.1; 423/213.5
(58) Field of Search ................ 423/239.1, 213.5; 502/326, 330, 339, 327, 333, 331

(56) References Cited

U.S. PATENT DOCUMENTS

| | | | |
|---|---|---|---|
| 4,212,854 | * | 7/1980 | Maki et al. ............................ 423/247 |
| 4,497,783 | * | 2/1985 | Barber ................................ 423/213.5 |
| 5,049,364 | * | 9/1991 | Yoshimoto et al. .................. 423/239 |
| 5,380,602 | * | 1/1995 | Nakatsuji et al. .................... 502/303 |
| 5,665,321 | * | 9/1997 | Campbell et al. ................. 423/239.1 |
| 5,795,553 | * | 8/1998 | Lott et al. ......................... 423/213.2 |
| 5,821,190 | * | 10/1998 | Kurabayashi et al. ............ 423/213.5 |
| 5,830,421 | * | 11/1998 | Gardner et al. .................. 423/239.1 |
| 5,898,014 | * | 4/1999 | Wu et al. ............................. 502/302 |
| 5,939,037 | * | 8/1999 | Hepburn et al. .................. 423/239.1 |
| 5,950,421 | * | 9/1999 | Chattha et al. ........................ 60/274 |
| 6,068,824 | * | 5/2000 | Kinoshita et al. ................ 423/239.1 |

* cited by examiner

Primary Examiner—Steven P. Griffin
Assistant Examiner—Cam N. Nguyen
(74) Attorney, Agent, or Firm—Bucknam and Archer

(57) ABSTRACT

The Pd/Al$_2$O$_3$ catalyst displayed significant activity towards conversion of NO into N$_2$ and O$_2$ at T>1050° K. On modifying the catalyst with NaOH, the required operation temperature may be lowered to 900° K. The modified Pd/Al$_2$O$_3$ may be used in stationary factories and power stations, as well as catalytic converters for abatement of NO$_x$ emission. Calorimetric and temperature-programmed-desorption studies revealed that observed catalytic activity at 900° K. resulted from a formation of interfacial sites which strongly adsorb NO molecules.

2 Claims, 2 Drawing Sheets

PD/NAOH-AL₂O₃ CATALYST FOR NOₓ ABATEMENTS

BACKGROUND OF THE INVENTION

1. Field of the Invention

Figure 1:
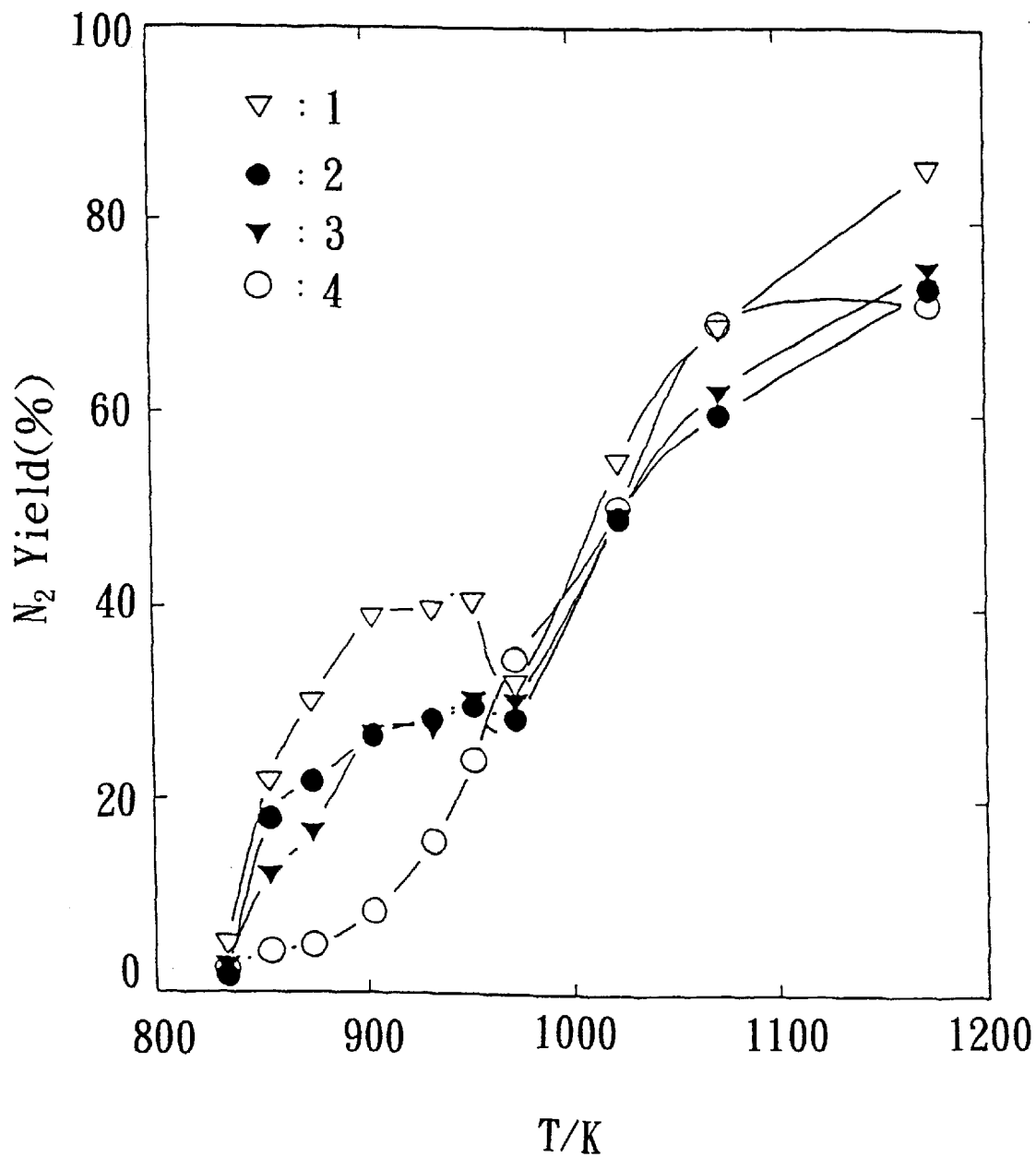

The present invention demonstrates how a new $Pd/Al_2O_3$ catalyst impregnated with NaOH may be used for decomposing NO from combustion exhausts, and its required operational temperature may be lowered to 900° K.

2. Description of the Prior Art $NO_x$ is an atmospheric pollutant that may cause respiratory tract diseases, acid rain and damages to the ozone layer. The majority of NO produced by human civilization are from high temperature (T>1500) combustion. The two main sources being the thermoelectric plants and internal-combustion engines. Under high temperature, oxygen and nitrogen in the atmosphere will generate NO, via intermediates of free radicals:

$$N_2 + xO_2 \rightarrow 2NO_x \quad (1)$$

Reaction (1) is an endothermic reaction. Thus when temperature rises due to combustion, the equilibrium of the above reaction will lean toward the right-hand side and generate a large amount of $NO_x$. This should be eliminated from exhaust gases on discharge so as to protect the ecological environment.

So far M. Shelef has proposed a method in Chem. Rev, Vol. 95, pp. 209, 1995 that eliminates $NO_x$ in the exhaust gas via the SCR method of using $NH_3(NH_2)_2$, or $(NH_2)_2CO$ as the reducing agent to catalyst and through the following reaction:

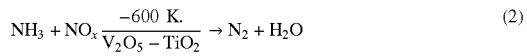

But this method consumes reducing agents and has both the problem of controlling the dosage of reducing agent, and high operating costs.

Fortunately the reverse reaction of (1) is an exothermic reaction. The equilibrium of reaction shifts to the left-hand side at low temperature. Therefore, with appropriate catalyst, NO will decompose into Nitrogen and Oxygen:

M. Iwamoto and others proposed in Catal. Today Vol.10, p. 57 (1991) that the Cu/Zeolite catalysts can obtain good NO decomposing activity at 800° K. Under the condition of reaction, however, the M. Iwamoto group reported in J. Phys. Chem. Vol. 95, p. 3727 (1991) that the above material will suffer from the problem of sulfur poisoning and a losing of Al from Zeolites and thus will become deactivated. Therefore it is necessary to switch to the other catalysts.

For $NO_x$ in the exhaust gases of vehicle, it is already known that the cleaning effect can be accomplished with three-way catalysts under the condition of controlled fuel-air ratio, by CO and RH reduction:

$$RH + CO + NO_x \rightarrow CO_2 + H_2O + N_2 \quad (4)$$

The main active ingredients of this three-way catalyst are Rh, Pt and Pd. Since Rh and Pt are more expensive, J. S. Hepburn and others already reported in SAE 941058 of a trend to replace them with mass-produced and cheaper (Pd) mono-metal catalyst. But the decomposition rate of Pd mono-metal catalyst against NO is low, and it is still necessary to improve this catalyst.

For the above reason, the inventors reported in Appl. Catal. B.: Environmental Vol. 6, pp.105 on developing $Pd/Al_2O_3$ as catalyst to promote reaction (3). The study showed that this catalyst indeed has good catalytic activity in reaction (3) at 1100K. The degree of activity is connected to the quantity of Pd applied. The mechanism of the catalytic reaction is as follows:

$$NO + [*] \rightarrow [*-NO] \quad (5)$$

$$[*-NO] + [*] \rightarrow [*-N] + [*-O] \quad (6)$$

$$2[*-N] \rightarrow 2[*] + N_2 \quad (7)$$

$$2[*-O] \rightarrow 2[*] + O_2 \quad (8)$$

[*] here represents Pd atoms exposed on the surface of catalyst in the above equations. Steps (5)–(7) in this reaction mechanism can be reacted smoothly at temperature as low as 500 K, but the activation energy of step (8) is so high (>200 kJ mol⁻¹) that the reaction obtains a faster rate only at temperatures as high as T>1000 K. therefore step (8) is the key step which hinders the reaction rate.

The inventors' research further showed that by improving the $Pd/Al_2O_3$ catalyst with Au, Ag or Cu metal additives, the required activation energy of reaction (8) will be reduced for 30 kJ mol⁻¹. Therefore the reaction temperature in reaction (3) can be reduced slightly. This research has been granted Japan patent No. 2,631,628 in 1997.

Recently the research of inventors showed that by coating the $Pd/Al_2O_3$ catalyst with NaOH, besides enhancing the original catalytic activity of reaction (3) at 1100 K, it produced a new peak of $N_2$ production at around 900 K. The activity of this region varies with the amount of NaOH added.

When the reaction gas (4% NO/He) passes through a 0.8 g catalytic bed at a flow rate of 30 ml ml⁻¹, NO content of the gas will be decomposed into nitrogen and oxygen. The present invention uses a 5A molecular sieve analyzing-tube to separate the products of reaction, and used the TCD to perform vapor phase layer analysis.

SUMMARY OF THE INVENTION

The present invention demonstrates a new $Pd/Al_2O_3$ catalyst impregnated with NaOH, in which the temperature of required operation may be lowered to 900° K. The NaOH coated $Pd/Al_2O_3$ may be used in stationary factories and power stations as well as catalytic converters for abatement of $NO_x$ emission. Calorimetric and temperature-programmed-adsorption studies revealed that the observed catalytic activity at 900K resulting from a formation of interfacial sites between coated NaOH and dispersed Pt on the catalyst. These sites can strongly adsorb NO molecules.

BRIEF DESCRIPTION OF THE INVENTION

Descriptions of Tables

Table 1: The decomposition rate of NO with various catalysts

NO concentration 4% W/F=1.52 g.s.cm³

Descriptions of illustrations

FIG. 1: Series of variable NaOH with 1.9% Pd(N): different NO conversion rate of NaOH—$Pd/Al_2O_3$ catalyst according to temperature change.

1. 13% NaOH
2. 16.4% NaOH 3. 6.5% NaOH 4. 1.3% NaOH

Figure 2:
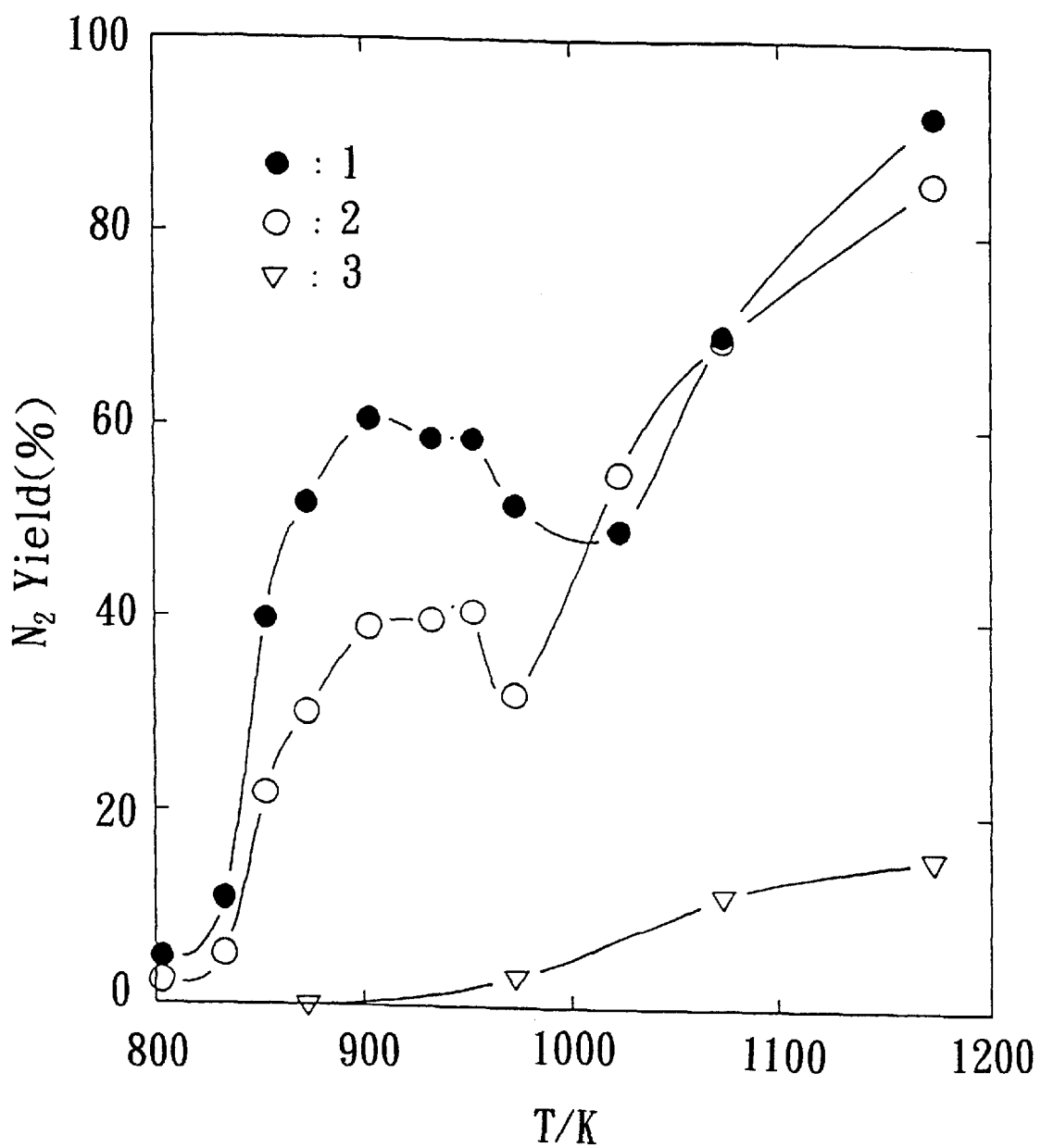

FIG. 2. Series of variable loads with 13% Pd(N): different NO conversion rate of NaOH—Pd/Al$_2$O$_3$ catalyst according to temperature change.

1. 4.8% Pd(N)

2. 1.9% Pd(N)

3. 0% Pd(N)

DESCRIPTION OF THE PREFERRED EMBODIMENTS

The present invention demonstrates a new thermal-decomposing denitrated Pd catalyst which is made by immersing heat resisting carrier such as Al$_2$O$_3$, MgAlO$_4$ etc. in alloy salt solution which contains an appropriate proportions of Pd and other precious metals such as Ag, Cu, Au etc., and then have such alloy metals go into holes in the carrier by the impregnation method. To give special effect to this kind of catalyst, one may add La series metals such as K, Ce, Nd, etc. and Ti series of metal such as Zr, HF, etc. as promoter. The MgAlO$_4$ above is made first from sol gel, then the appropriate alloy proportions is made from different metals and alloys by known technologies. Additing promoters such as K, La or Ti series of metal, etc. are formed by adding oxidized nitric salt, carbonate salt compounds in the immerging solution. Examples are (Ce(NO$_3$)$_3$ H$_2$O), (Zr(NO$_3$)$_3$ H$_2$O), (K$_2$CO$_3$), (CeO$_2$) catalysts that modify the Pd alloy.

The amount of precious metal or alloy of catalyst affects on the decomposition rate of NO decomposition, and also differs according to different carriers. The best range of Pd content in Al$_2$O$_3$ carrier is 0.05%–5%. The best range of Pd content in Al$_2$O$_3$ carrier is 0.1%–2%. Group IB metals such as Ag, Cu, Au can promote the catalytic activity of Pd/Al$_2$O$_3$ on Al$_2$O$_3$ carrier, which is added to make the proportion of the alloy to be Pd/Cu=10:1, Pd/Ag=20:1, Pd/Au=40:10.

It is appropriate to add 1.0%–20% NaOH, depending on the characteristic of Al$_2$O$_3$. The yield of N$_2$ can be 60% when 13% NaOH immersed Degussa Al$_2$O$_3$ is used as the carrier. The effect of adding NaOH to the activity of 1.9% Pd/Al$_2$O$_3$ catalyst is shown in FIG. 1. NO decomposing activity of the catalyst without adding NaOH was low at T<850° K. The activity increases with temperature, the yield of N$_2$ can reach 80% as was reported in Gatal B.: Environmental, Vol. 6, pp.105 (1998). By applying the method of the present invention, there is one more N$_2$ decomposing peak of 1.9% Pd/NaOH—Al$_2$O$_3$ catalyst showing up around 900° K. after adding NaOH. The yield of N$_2$ varies with the amount of NaOH added. As shown in the figure, The yield of N$_2$ can be raised a little bit when 1.3% NaOH is added. The yield of N$_2$ is more than 20% when more than 6.5% NaOH is added. The yield of N$_2$ can be as high as 40% when 13% NaOH is added at T=900° K.

Therefore the yield of N$_2$ at T=900° K. varies with the amount of NaOH added in the catalyst.

As shown in FIG. 2, there is no NO decomposing activity of the 13% NaOH—Al$_2$O$_3$ carrier without adding Pd at this temperature. The yield of N$_2$ can be 60% when the amount of Pd is increased to be 4.8 wt %. Therefore the reaction temperature required by NO catalytic decomposition may be decreased from 1100° K. to 900° K. such that its application has been greatly enhanced.

As reported in Appl. Catal B: Environmental, Vol. 17, pp.51–62 (1998) by those researchers who conducted calorimetric studies and temperature-programmed-desorption studies, there are some sites "*i" which can absorb NO strongly exist at the interface between Pd and NaOH. The desorptive temperature of the absorbed NO at from these sites is increased from 400° K. to around 950° K. since the absorptive heat is high (Q$_{ad}$>140 kJmol$^{-1}$(NO).

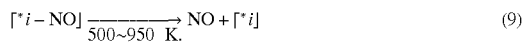
$$\lceil *i - NO \rfloor \xrightarrow[500\sim950\ K.]{} NO + \lceil *i \rfloor \qquad (9)$$

The oxygen atoms adsorbed on palladium will migrate to the interface site to generate $\lceil *NO_2 \rfloor$ or $\lceil *NO_3 \rfloor$ around 900° K., and then decompose to N$_2$ and O$_2$:

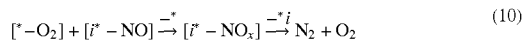
$$[*-O_2] + [i^* - NO] \xrightarrow{\overset{*}{\rightarrow}} [i^* - NO_x] \xrightarrow{\overset{*i}{\rightarrow}} N_2 + O_2 \qquad (10)$$

Therefore, with the assistance of NaOH, reaction (10) replaces reaction (8) to be the key step in determining the de-oxygen rate, and reduces the required activation energy of reaction (3) and the processing temperature.

In summary, Pd/NaOH—Al$_2$O$_3$ catalyst of the present invention can be applied in combustors as well as catalytic converters for the abatement of NO$_x$ emission. The combustors are for power station using natural gas as fuel or for exhaust gas handling in cogeneration systems. The catalytic converters are monometal(Pd/Al$_2$O$_3$) catalyst converters specially. Pd/NaOH—Al$_2$O$_3$ catalyst of the present invention is used in exhaust gas handling between T=900+100° K., in which the content of Pd is more than 1.0 wt %, the content of NaOH is about 10 wt %.

What is claimed is:

1. A method of abatement of NO$_2$ emission which consists essentially of applying in the combustion exhausts in which NO$_2$ is formed a Pd/NaOH—Al$_2$O$_3$ catalyst, in which the Pd amount is 0.05%–5% and the amount of NaOH is 1%–20% at a temperature of 900±100° K. and wherein Ag, Cu, and Au are added to the Al$_2$O$_3$ to make Pd/Cu=10:1; Pd/Ag=20:1; and Pd/Au=40:10, whereby N$_2$ and oxygen are produced.

2. The method according to claim 1, wherein the Pd amount is 0.1% to 2% and the amount of NaOH is 13%.

* * * * *